(12) United States Patent
Akkapeddi et al.

(10) Patent No.: US 9,018,284 B2
(45) Date of Patent: *Apr. 28, 2015

(54) OXYGEN SCAVENGING ADDITIVES FOR PLASTIC CONTAINERS

(75) Inventors: Murali K. Akkapeddi, York, PA (US); Brian A. Lynch, Merrimack, NH (US)

(73) Assignee: Graham Packaging Company, L.P., York, PA (US)

( * ) Notice: Subject to any disclaimer, the term of this patent is extended or adjusted under 35 U.S.C. 154(b) by 969 days.

This patent is subject to a terminal disclaimer.

(21) Appl. No.: 13/102,597

(22) Filed: May 6, 2011

(65) Prior Publication Data

US 2011/0275742 A1    Nov. 10, 2011

Related U.S. Application Data

(60) Provisional application No. 61/332,054, filed on May 6, 2010.

(51) Int. Cl.
  *C08K 5/098*    (2006.01)
  *C08K 5/3415*   (2006.01)
  *C08K 5/3417*   (2006.01)

(52) U.S. Cl.
  CPC ............ *C08K 5/098* (2013.01); *C08K 5/3415* (2013.01); *C08K 5/3417* (2013.01); *C08K 2201/012* (2013.01)

(58) Field of Classification Search
  CPC .... C08K 5/3415; C08K 5/3417; C08K 5/098; C08K 2201/012
  USPC .................. 524/89, 94, 105, 431; 252/188.28
  See application file for complete search history.

(56) References Cited

U.S. PATENT DOCUMENTS

| | | | |
|---|---|---|---|
| 4,536,409 | A | 8/1985 | Farrell et al. |
| 4,611,049 | A | 9/1986 | Kuratsuji et al. |
| 5,021,515 | A | 6/1991 | Cochran et al. |
| 5,049,624 | A | 9/1991 | Adams et al. |
| 5,075,362 | A | 12/1991 | Hofeldt et al. |
| 5,211,875 | A | 5/1993 | Speer et al. |
| 5,639,815 | A | 6/1997 | Cochran et al. |
| 6,083,585 | A | 7/2000 | Cahill et al. |
| 6,254,803 | B1 | 7/2001 | Matthews et al. |
| 6,423,776 | B1 | 7/2002 | Akkapeddi et al. |
| 6,455,620 | B1 | 9/2002 | Cyr et al. |
| 6,558,762 | B2 | 5/2003 | Cahill et al. |

(Continued)

FOREIGN PATENT DOCUMENTS

| | | |
|---|---|---|
| EP | 1 911 606 | 4/2008 |
| WO | 2009/032560 | 3/2009 |
| WO | WO 2010/042125 | 4/2010 |

OTHER PUBLICATIONS

International Search Report and Written Opinion for PCT/US2011/035570 dated Aug. 17, 2011 as prepared by the European Patent Office.

*Primary Examiner* — Susannah Chung
*Assistant Examiner* — Josephine Chang
(74) *Attorney, Agent, or Firm* — Stradley Ronon Stevens & Young, LLP

(57) ABSTRACT

The present invention provides a composition comprising: a base polymer; at least one compound having the structure of Formula I or II

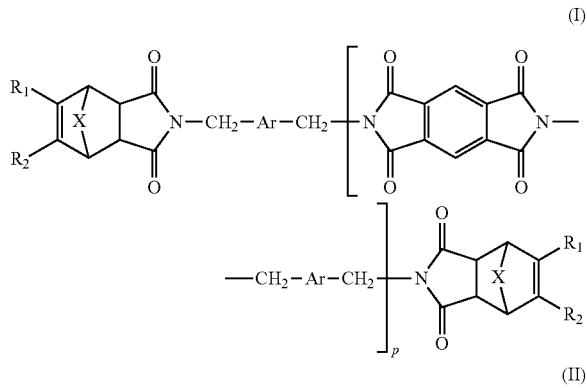

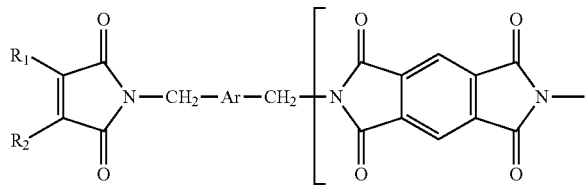

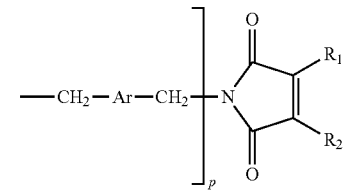

wherein Ar is an o-, m-, or p-phenylene moiety, a substituted phenylene moiety, or a naphthalene moiety; $R_1$ and $R_2$ are independently selected from the group consisting of: hydrogen, alkyl, alkenyl, and aryl; and X is O or $-(CH_2)_n-$; n=0, 1, or 2; and p=0, 1, or 2; and; and at least one transition metal in a positive oxidation state, said metal being present in the composition in an amount of from about 10 to about 400 ppm, wherein said compound is present in an amount of from about 0.10 to about 10 weight percent of the composition.

26 Claims, 4 Drawing Sheets

(56) References Cited

U.S. PATENT DOCUMENTS

| | | |
|---|---|---|
| 7,396,865 B2 | 7/2008 | Tsuji et al. |
| 8,450,398 B2 | 5/2013 | Deshpande |
| 2004/0013833 A1 | 1/2004 | Lee et al. |
| 2004/0043172 A1 | 3/2004 | Schmidt et al. |
| 2004/0044118 A1 | 3/2004 | Waddell et al. |
| 2006/0148957 A1 | 7/2006 | Stewart et al. |
| 2006/0180790 A1 | 8/2006 | Deshpande et al. |
| 2008/0075965 A1 | 3/2008 | Dershem |
| 2008/0161529 A1 | 7/2008 | Jenkins et al. |
| 2008/0277622 A1* | 11/2008 | Deshpande et al. ..... 252/188.28 |
| 2009/0278087 A1 | 11/2009 | Deshpande et al. |
| 2010/0154361 A1 | 6/2010 | Deshpande et al. |
| 2011/0123741 A1 | 5/2011 | Deshpande |
| 2012/0114887 A1 | 5/2012 | Drbohlav, III et al. |
| 2012/0214935 A1 | 8/2012 | Roodvoets et al. |

* cited by examiner

FIG. 2 Proton NMR spectrum of MXBT

OXYGEN SCAVENGING ADDITIVES FOR PLASTIC CONTAINERS

CROSS-REFERENCE TO RELATED APPLICATIONS

This application claims the benefit of priority under 35 U.S.C. §119(e) to earlier filed U.S. provisional patent application Ser. No. 61/332,054, filed on May 6, 2010, the disclosure of which is incorporated herein by reference in its entirety.

BACKGROUND OF THE INVENTION

The present invention relates to compounds useful for oxygen scavenging. The invention also relates to substantially transparent compositions that comprise a base polymer, an oxidizable organic component, and a transition metal. The invention also is directed to uses of such compositions in the construction of packaging for oxygen sensitive materials.

All references, including publications, patent applications, and patents, cited herein are hereby incorporated by reference to the same extent as if each reference were individually and specifically indicated to be incorporated by reference and were set forth in its entirety herein.

It is known in the art to include an oxygen scavenger in the packaging structure for the protection of oxygen sensitive materials. Such scavengers are believed to react with oxygen that is trapped in the package or that permeates from outside of the package, thus extending to life of package contents. These packages include films, bottles, containers, and the like. Food, beverages (such as beer and fruit juices), cosmetics, medicines, and the like are particularly sensitive to oxygen exposure and require high barrier properties to oxygen to preserve the freshness of the package contents and avoid changes in flavor, texture and color.

Use of certain polyamides in combination with a transition metal is known to be useful as the oxygen scavenging material. One particularly useful polyamide is MXD6 which contains meta-xylene residues in the polymer chain. See, for example, U.S. Pat. Nos. 5,639,815; 5,049,624; and 5,021,515.

Other oxygen scavengers include potassium sulfite (U.S. Pat. No. 4,536,409), unsaturated hydrocarbons (U.S. Pat. No. 5,211,875), and ascorbic acid derivatives (U.S. Pat. No. 5,075,362).

In barrier layers of packaging walls that are made from blends of oxygen scavenging materials with base polymer resins such as PET, haze can result due to such factors as the immiscibility of the scavenging materials (especially when the scavenging material is a polymeric material) with the base polymer resins and the inability to create by mechanical blending means disperse-phase domains that are so small as not to interfere with the passage of light therethrough; and the adverse influence of the scavenging material on the crystallization behavior of PET base resin. One approach to minimizing such haze is careful selection of base resin to improve dispersibility of the scavenger material and, thus, reduce, but not substantially eliminate, haze; and to minimize the adverse crystallization effect. This approach may undesirably narrowly restrict the choice of base polymer resin. Another approach is to use compositions that serve as compatibilizers to reduce haze. These approaches add cost to the layer and the compatibilizer adds an additional material that must be evaluated for its suitability for contact with food. Thus, there is a need in the art for improved materials such as low molecular weight organic compounds which provide high oxygen scavenging capability when blended into PET to form containers while maintaining substantial transparency.

BRIEF SUMMARY OF THE INVENTION

The present invention provides a composition comprising: a base polymer; at least one compound having the structure of Formula I or II

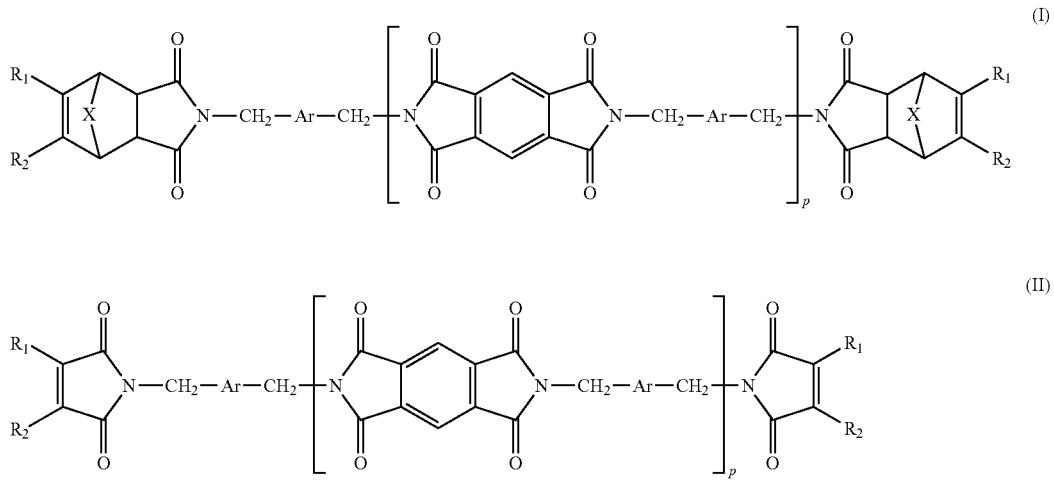

wherein Ar is an o-, m-, or p-phenylene moiety, a substituted phenylene moiety, or a naphthalene moiety; $R_1$ and $R_2$ are independently selected from the group consisting of: hydrogen, alkyl, alkenyl, and aryl; X is O or —$(CH_2)_n$—; n=0, 1, or 2; and p=0, 1, or 2; and at least one transition metal in a positive oxidation state, said metal being present in the composition in an amount of from about 10 to about 400 ppm, wherein said compound is present in an amount of from about 0.10 to about 10 weight percent of the composition.

In another aspect, the present invention provides a wall of a package comprising at least one layer, the layer comprising a composition, the composition comprising: a base polymer; at least one compound having the structure of Formula I or II

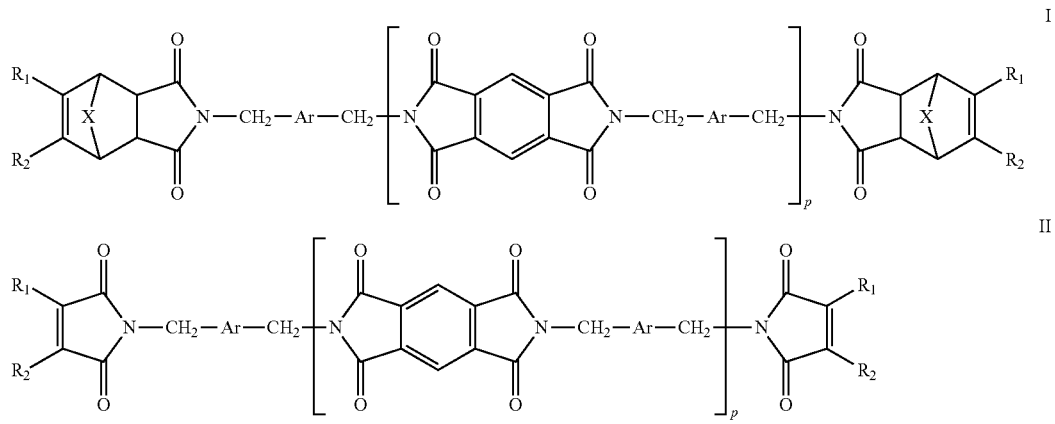

wherein Ar is an o-, m-, or p-phenylene moiety, a substituted phenylene moiety, or a naphthalene moiety; $R_1$ and $R_2$ are independently selected from the group consisting of: hydrogen, alkyl, alkenyl, and aryl; X is O or —$(CH_2)_n$—; n=0, 1, or 2; and p=0, 1, or 2; and at least one transition metal in a positive oxidation state, said metal being present in the composition in an amount of from about 10 to about 400 ppm, wherein said compound is present in an amount of from about 0.10 to about 10 weight percent of the composition.

In yet another aspect, the present invention provides method for packaging an oxygen sensitive material comprising: preparing a package having a wall comprising at least one layer, at least one of said layers comprising a composition, said composition comprising a base polymer; at least one compound having the structure of Formula I or II

DETAILED DESCRIPTION OF THE INVENTION

Figure 1:
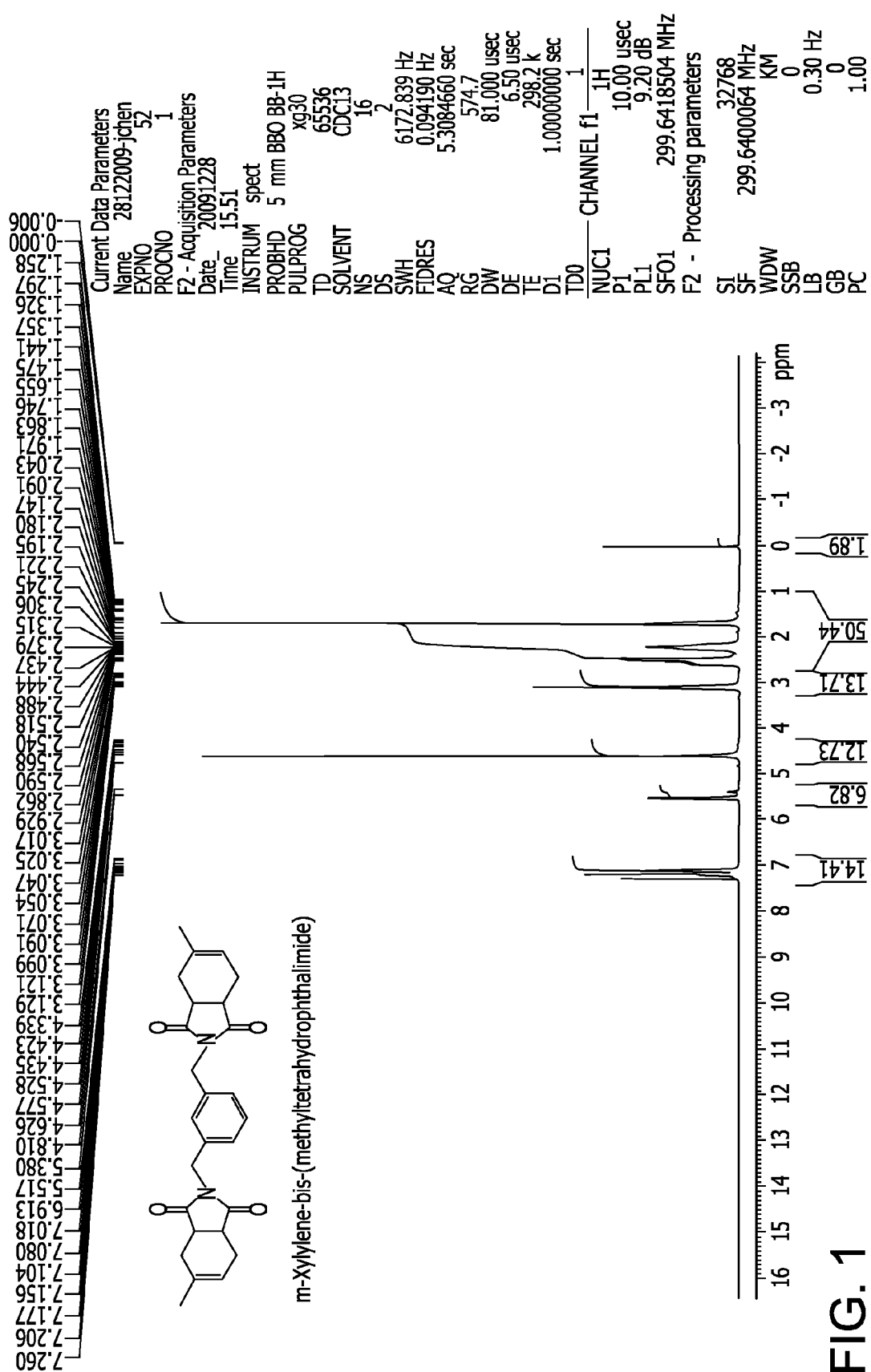
FIG. 1 is a proton NMR spectra of an oxygen scavenging compound for use in the present invention.

The present invention concerns compositions that are useful in the manufacture of packaging for oxygen sensitive

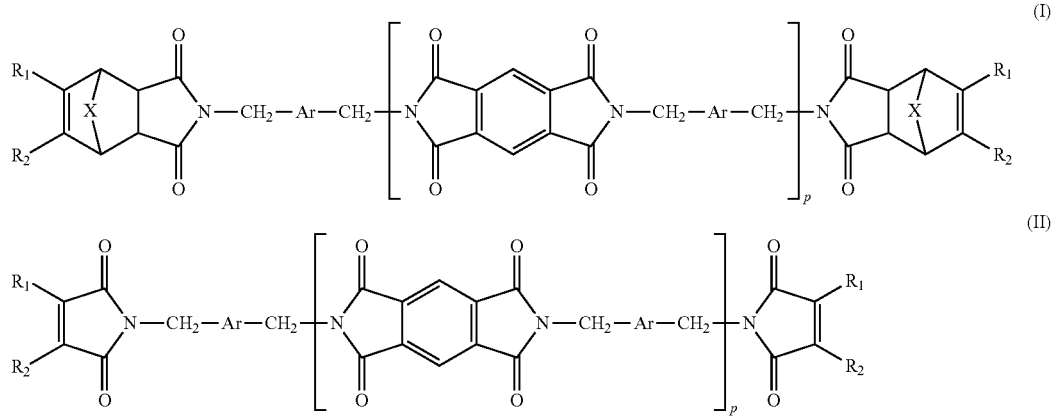

wherein Ar is an o-, m-, or p-phenylene moiety, a substituted phenylene moiety, or a naphthalene moiety; $R_1$ and $R_2$ are independently selected from the group consisting of: hydrogen, alkyl, alkenyl, and aryl; X is O or —$(CH_2)_n$—; n=0, 1, or 2; and p=0, 1, or 2; and at least one transition metal in a positive oxidation state, said metal being present in the composition in an amount of from about 10 to about 400 ppm, wherein said compound is present in an amount of from about 0.10 to about 10 weight percent of the composition; introducing said oxygen sensitive material into said package; and closing said package.

materials. In some embodiments, the invention concerns a polyester polymer composition comprising a non-polymeric oxidizable organic component wherein the composition exhibits excellent oxygen scavenging properties as well as excellent clarity (i.e., lack of haze) when blow molded, for example, from a preform into a monolater container via an injection stretch blow molding process.

It is preferred that the non-polymeric oxidizable organic component of the present invention has a high degree of affinity for polyesters.

In certain preferred embodiments, the invention concerns compositions that contain a base polymer, a transition metal in a positive oxygen state, and at least one non-polymeric oxidizable organic component present in an amount of from about 0.10 to 10 weight present of the composition and the component comprising at least one compound having the structure of Formula I or II substituents include alkyl, alkoxy, aryloxy, hydroxy, acetyl, cyano, nitro, glyceryl, and carbohydrate, or two substituents taken together may be linked as an -alkylene-group to form a ring.

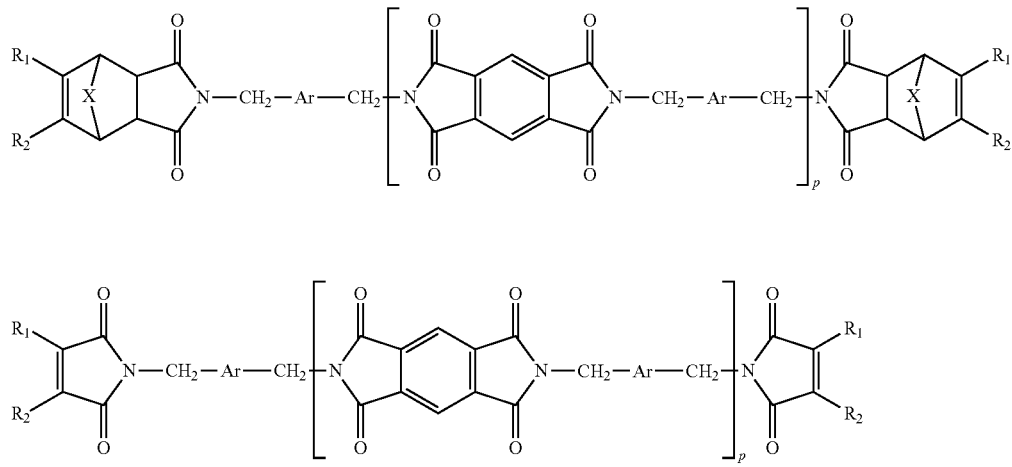

wherein Ar is an o-, m-, or p-phenylene moiety, a substituted phenylene moiety, or a naphthalene moiety; $R_1$ and $R_2$ are independently selected from the group consisting of: hydrogen, alkyl, alkenyl, and aryl; X is O or $—(CH_2)_n—$; n=0, 1, or 2; and p=0, 1, or 2.

As used herein, the term "alkyl" refers to a substituted or unsubstituted aliphatic hydrocarbon chain. Alkyl groups have straight and branched chains. In some embodiments, alkyls have from 1 to 12 carbon atoms or 1 to 6 carbon atoms, unless explicitly specified otherwise. Alkyl groups include, bur are not limited to methyl, ethyl, propyl, isopropyl, butyl, 1-butyl and t-butyl. Specifically included within the definition of "alkyl" are those aliphatic hydrocarbon chains that are optionally substituted.

The term "alkenyl" is defined herein as ($C_2$-$C_{20}$) straight chain or branched-chain bivalent hydrocarbon moiety derived from an alkane or alkene that is mono or polyunsaturated. Such groups include those in the E or Z configurations and all possible combinations of E and Z configurations. Some preferred alkylene chains have 2-7 carbon atoms.

The term "aryl" is defined herein as an aromatic carbocyclic moiety of up to 20 carbon atoms. In some embodiments, aryl groups have 6-20 carbon atoms or 6-14 carbon atoms. Aryls may be a single ring (monocyclic) or multiple rings (bicyclic, up to three rings) fused together or linked covalently. Any suitable ring position of the aryl moiety may be covalently linked to the defined chemical structure. Aryl groups include, but are not limited to, phenyl, 1-naphthyl, 2-naphthyl, dihydronaphthyl, tetrahydronaphthyl, biphenyl, anthryl, phenanthryl, fluorenyl, indanyl, biphenylenyl, acenaphthenyl, and acenaphthylenyl. In some embodiments, phenyl is a preferred aryl. Aryl groups may also be optionally substituted with one or more substituents.

Optional substituents for alkyl, alkenyl, aryl, or heteroaryl groups are well known to those skilled in the art. These In one aspect, the oxidizable organic component of the present invention is the compound m-xylylene-bis-(tetrahydrophthalimide) ("MXBT"):

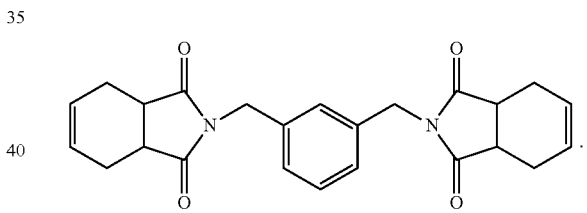

MXBT is an exemplary species of formula I wherein Ar is an m-phenylene moiety, $R_1$ is H, $R_2$ is H, and X is $—(CH_2)_n—$, where n is 0 and p is 0.

In yet another aspect, the oxidizable organic component of the present invention is the compound m-xylylene-bis-(methyltetrahydrophthalimide) ("MXBMT"):

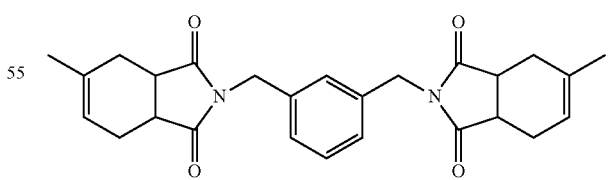

MXBMT is an exemplary species of formula I wherein Ar is an m-phenylene moiety, $R_1$ is methyl, $R_2$ is H, and X is $—(CH_2)_n—$, where n is 0 and p is 0.

In another aspect the oxidizable organic component of the present invention is the compound m-xylylene-bis-(octenyl succinimide) ("MXBO"):

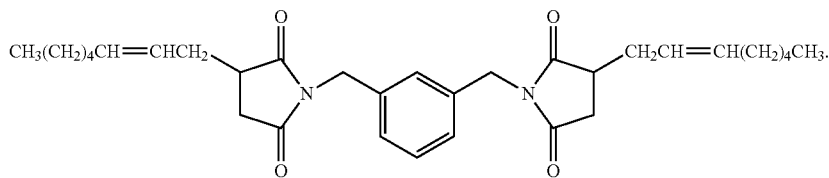

MXBO is an exemplary species of formula II wherein Ar is an m-phenylene moiety, $R_1$ is an alkenyl group, $R_2$ is H, and p is 0.

In another aspect, the oxidizable organic component of the present invention is the compound m-xylylene-bis-citraconimide ("MXBC"):

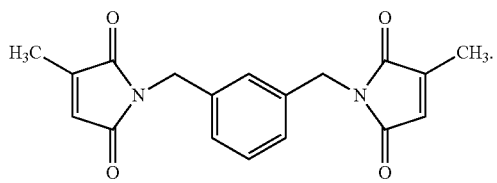 [SMILES: CC1=CC(=O)N(Cc2cccc(CN3C(=O)C=C(C)C3=O)c2)C1=O]

MXBC is an exemplary species of formula II wherein Ar is an m-phenylene moiety, $R_1$ is an alkyl group, $R_2$ is H, and p is 0.

In yet another aspect, the oxidizable organic component of the present invention is the compound m-xylylene-bis(methylnadimide) ("MXBMN"):

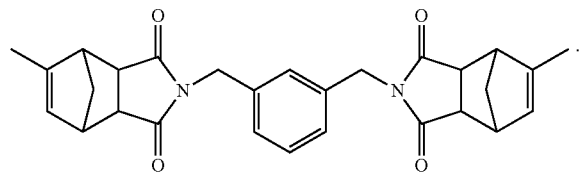

MXBMN is an exemplary species of formula I wherein Ar is an m-phenylene moiety, $R_1$ is methyl, $R_2$ is H, and X is —$(CH_2)_n$—, where n is 1 and p is 0.

In yet another aspect, the oxidizable organic component of the present invention is the compound m-xylylene-bis (nadimide) ("MXBN"):

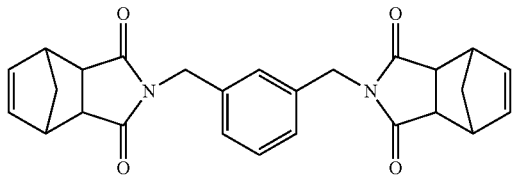 [SMILES: O=C1C2C3C=CC(C3)C2C(=O)N1Cc1cccc(CN2C(=O)C3C4C=CC(C4)C3C2=O)c1]

MXBN is an exemplary species of formula I wherein Ar is an m-phenylene moiety, $R_1$ and $R_2$ is H, and X is —$(CH_2)_n$—, where n is 1 and p is 0.

Compositions of the instant invention comprise a base polymer. As used herein, the term "base polymer" refers to a polymer component of a container of the present invention that provides the structure and mechanical properties of the container. The term "base polymer" is synonymous with the term "structural polymer," which is commonly used in the art.

In preferred embodiments, the base polymer is a polyester. In certain embodiments, the polyester polymers of the invention are thermoplastic and, thus, the form of the compositions are not limited and can include a composition in the melt phase polymerization, as an amorphous pellet, as a solid stated polymer, as a semi-crystalline particle, as a composition of matter in a melt processing zone, as a bottle preform, or in the form of a stretch blow molded bottle or other articles. In certain preferred embodiments, the polyester is polyethylene terephthalate (PET).

Examples of suitable polyester polymers include polyethylene terephthalate homopolymers and copolymers modified with one or more polycarboxylic acid modifiers in a cumulative amount of less than about 15 mole %, or about 10 mole % or less, or about 8 mole % or less, or one or more hydroxyl compound modifiers in an amount of less than about 60 mol %, or less than about 50 mole %, or less than about 40 mole %, or less than about 15 mole %, or about 10 mole % or less, or about 8 mole % or less (collectively referred to for brevity as "PET") and polyethylene naphthalate homopolymers and copolymers modified with a cumulative amount of with less than about 15 mole %, or about 10 mole % or less, or about 8 mole % or less, of one or more polycarboxylic acid modifiers or modified less than about 60 mol %, or less than about 50 mole %, or less than about 40 mole %, or less than about 15 mole %, or about 10 mole % or less, or about 8 mole % or less of one or more hydroxyl compound modifiers (collectively referred to herein as "PEN"), and blends of PET and PEN. A modifier polycarboxylic acid compound or hydroxyl compound is a compound other than the compound contained in an amount of at least about 85 mole %. The preferred polyester polymer is polyalkylene terephthalate, and most preferred is PET.

In some embodiments, the polyester polymer contains at least about 90 mole % ethylene terephthalate repeat units, and in other embodiments, at least about 92 mole %, and in yet other embodiments, or at least about 94 mole %, based on the moles of all repeat units in the polyester polymers.

In addition to a diacid component of terephthalic acid, derivates of terephthalic acid, naphthalene-2,6-dicarboxylic acid, derivatives of naphthalene-2,6-dicarboxylic acid, or mixtures thereof, the polycarboxylic acid component(s) of the present polyester may include one or more additional modifier polycarboxylic acids. Such additional modifier polycarboxylic acids include aromatic dicarboxylic acids preferably having about 8 to about 14 carbon atoms, aliphatic dicarboxylic acids preferably having about 4 to about 12 carbon atoms, or cycloaliphatic dicarboxylic acids preferably having about 8 to about 12 carbon atoms. Examples of modifier dicarboxylic acids useful as an acid component(s) are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "polycarboxylic acid." It is also possible for trifunctional and higher order polycarboxylic acids to modify the polyester.

The hydroxyl component is made from compounds containing 2 or more hydroxyl groups capable of reacting with a carboxylic acid group. In some preferred embodiments, preferred hydroxyl compounds contain 2 or 3 hydroxyl groups. Certain preferred embodiments, have 2 hydroxyl groups. These hydroxyl compounds include $C_2$-$C_4$ alkane diols, such as ethylene glycol, propane diol, and butane diol, among which ethylene glycol is most preferred for container applications. In addition to these diols, other modifier hydroxyl compound component(s) may include diols such as cycloaliphatic diols preferably having 6 to 20 carbon atoms and/or aliphatic diols preferably having about 3 to about 20 carbon atoms. Examples of such diols include diethylene glycol; triethylene glycol; 1,4-cyclohexanedimethanol; propane-1,3-diol and butane-1,4-diol (which are considered modifier diols if ethylene glycol residues are present in the polymer in an amount of at least 85 mole % based on the moles of all hydroxyl compound residues); pentane-1,5-diol; hexane-1,6-diol; 3-methylpentanediol-(2,4); neopentyl glycol; 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. Typically, polyesters such as polyethylene terephthalate are made by reacting a glycol with a dicarboxylic acid as the free acid or its dimethyl ester to produce an ester monomer and/or oligomers, which are then polycondensed to produce the polyester.

In some preferred embodiments, modifiers include isophthalic acid, naphthalenic dicarboxylic acid, trimellitic anhydride, pyromellitic dianhydride, 1,4-cyclohexane dimethanol, and diethylene glycol. The amount of the polyester polymer in the formulated polyester polymer composition ranges from greater than about 50.0 wt. %, or from about 80.0 wt. %, or from about 90.0 wt. %, or from about 95.0 wt. %, or from about 96.0 wt. %, or from about 97 wt. %, and up to about 99.90 wt. %, based on the combined weight of all polyester polymers and all polyamide polymers. The formulated polyester polymer compositions may also include blends of formulated polyester polymer compositions with other thermoplastic polymers such as polycarbonate. In some preferred compositions, the polyester comprises a majority of the composition of the inventions, and in some embodiments the polyester is present in an amount of at least about 80 wt. %, or at least about 90 wt. %, based on the weight of the composition (excluding fillers, inorganic compounds or particles, fibers, impact modifiers, or other polymers serve as impact modifiers or which form a discontinuous phase such as may be found in cold storage food trays).

The polyester compositions can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

Other base polymers may be used with the instant invention. One example is polypropylene.

The transition metal used in the instant compositions is a metal in the positive oxidation state. It should be noted that it is contemplated that one or more such metals may be used. The transition metal functions to catalyze or promote the oxidation of the organic oxidizable component (i.e., the reaction of the organic oxidizable component with molecular oxygen).

The transition metal can be selected from the first, second, or third transition series of the Periodic Table. The metal can be Rh, Ru, or one of the elements in the series of Sc to Zn (i.e., Sc, Ti, V, Cr, Mn, Fe, Co, Ni, Cu, and Zn). In some embodiments, cobalt is added in +2 or +3 oxidation state. In some embodiments, it is preferred to use cobalt in the +2 oxidation state. In certain embodiments, copper in the +2 oxidation state is utilized. In some embodiments, rhodium in the +2 oxidation state is used. In certain embodiments, zinc may also be added to the composition. Preferred zinc compounds include those in a positive oxidation state.

Suitable counter-ions to the transition metal cations include carboxylates, such as neodecanoates, octanoates, acetates, lactates, naphthalates, malates, stearates, acetylacetonates, linoleates, oleates, palmitates, 2-ethylhexanoates, or ethylene glycolates; or as their oxides, borates, carbonates, chlorides, dioxides, hydroxides, nitrates, phosphates, sulfates, or silicates among others.

In some embodiments, levels of at least about 10 ppm, or at least about 50 ppm, or at least about 100 ppm of metal can achieve suitable oxygen scavenging levels. The exact amount of transition metal used in an application can be determined by trials that are well within the skill level of one skilled in the art. In some embodiments involving wall applications (as opposed to master batch applications where more catalyst is used), it is preferred to keep the level of metal below about 300 ppm and, in other embodiments, preferably below about 250 ppm. In master batch compositions, the level of transition metal may range from about 1000 to about 10,000 ppm. In some preferred embodiments, the range is from about 2000 to about 5000 ppm.

The transition metal or metals may be added neat or in a carrier (such as a liquid or wax) to an extruder or other device for making the article, or the metal may be present in a concentrate or carrier with the oxidizable organic component, in a concentrate or carrier with a base polymer, or in a concentrate or carrier with a base polymer/oxidizable organic component blend. Alternatively, at least a portion of the transition metal may be added as a polymerization catalyst to the melt phase reaction for making the base polymer (a polyester polymer in some embodiments) and be present as residual metals when the polymer is fed to the melting zone (e.g. the extrusion or injection molding zone) for making the article such as a preform or sheet. It is desirable that the addition of the transition metal does not substantially increase the intrinsic viscosity (IV) of the melt in the melt processing zone. Thus, transition metal or metals may be added in two or more stages, such as once during the melt phase for the production of the polyester polymer and again once more to the melting zone for making the article.

The amounts of the components used in the oxygen scavenging formulations of the present invention can affect the use and effectiveness of this composition. Thus, the amounts of base polymer, transition metal catalyst, antioxidant, polymeric diluents, additives, etc., can vary depending on the desired article and its end use. For example, the primary function of the organic oxidizable component of formulas I or II described above is to react irreversibly with oxygen during the scavenging process, while a primary function of the transition metal catalyst is to facilitate this process. Thus, to a large extent, the amount of the organic oxidizable component present affects the oxygen scavenging capacity of the composition, i.e., the amount of oxygen that the composition can consume, while the amount of transition metal catalyst affects the rate at which oxygen is consumed as well as the induction period.

The oxygen scavenger composition of the present invention can be incorporated in packaging articles having various forms. Suitable articles include, but are not limited to, flexible sheet films, flexible bags, pouches, semi-rigid and rigid containers such as bottles (e.g., PET bottles) or metal cans, or combinations thereof.

Typical flexible films and bags include those used to package various food items and may be made up of one or a multiplicity of layers to form the overall film or bag-like packaging material. The oxygen scavenger composition of the present invention can be used in one, some or all of the layers of such packaging material.

Typical rigid or semi-rigid articles include plastic, paper or cardboard containers, such as those utilized for juices, soft drinks, as well as thermoformed trays or cup normally having thickness in the range of from 100 to 1000 micrometers. The walls of such articles can comprise single or multiple layers of materials. The articles can also take the form of a bottle or metal can, or a crown, cap, crown or cap liner, plastisol or gasket. The oxygen scavenger composition of the present invention can be used as an integral layer or portion of, or as an external or internal coating or liner of, the formed semi-rigid or rigid packaging article. As a liner, the oxygen scavenger composition can be extruded as a film along with the rigid article itself, in, e.g., a coextrusion, extrusion coating, or extrusion lamination process, so as to form the liner in situ during article production; or alternatively can be adhered by heat and/or pressure, by adhesive, or by any other suitable method to an outer surface of the article after the article has been produced.

In one preferred embodiment of the present invention, the composition of the present invention, i.e., a base polymer, a transition metal in a positive oxygen state, and at least one non-polymeric oxidizable organic component having the structure of formula I or II, can be employed to form a monolayer bottle. In another preferred embodiment of the present invention, the composition of the present invention can form one layer of a multilayer bottle wherein the layer comprising the composition of the present invention comprises from at least 1% and typically 2 to 6% of a compound having the structure of formula I or II.

Besides articles applicable for packaging food and beverage, articles for packaging other oxygen-sensitive products can also benefit from the present invention. Such products would include pharmaceuticals, oxygen sensitive medical products, corrodible metals or products, electronic devices and the like.

The composition may also include other components such as pigments, fillers, crystallization aids, impact modifiers, surface lubricants, denesting agents, stabilizers, ultraviolet light absorbing agents, metal deactivators, nucleating agents such as polyethylene and polypropylene, phosphite stabilizers and dyestuffs. Other additional components are well known to those skilled in the art and can be added to the existing composition so long as they do not negatively impact the performance of the compositions. Typically, the total quantity of such components will be less than about 10% by weight relative to the whole composition. In some embodiments, the amount of these optional components is less than about 5%, by weight relative to the total composition.

A common additive used in the manufacture of polyester polymer compositions used to make stretch blow molded bottles is a reheat additive because the preforms made from the composition must be reheated prior to entering the mold for stretch blowing into a bottle. Any of the conventional reheat additives can be used, such additives include various forms of black particles, e.g. carbon black, activated carbon, black iron oxide, glassy carbon, and silicon carbide; the gray particles such as antimony, and other reheat additives such as silicas, red iron oxide, and so forth.

In many applications, not only are the packaging contents sensitive to the ingress of oxygen, but the contents may also be affected by UV light. Fruit juices and pharmaceuticals are two examples of such contents. Accordingly, in some embodiments, it is desirable to incorporate into the polyester composition any one of the known UV absorbing compounds in amounts effective to protect the packaged contents.

The instant compositions can be made by mixing a base polymer (PET, for example) with the oxidizable organic component and the transition metal composition. Such compositions can be made by any method known to those skilled in the art. In certain embodiments, some or part of the transition metal may exist in the base polymer prior to mixing. This residual metal, for example, can exist from the manufacturing process of the base polymer. In some embodiments, the base polymer, the oxidizable organic component and the transition metal are mixed by tumbling in a hopper. Other optional ingredients can be added during this mixing process or added to the mixture after the aforementioned mixing or to an individual component prior to the aforementioned mixing step.

The instant composition can also be made by adding each ingredient separately and mixing the ingredients prior melt processing the composition to form an article. In some embodiments, the mixing can be just prior to the melt process zone. In other embodiments, one or more ingredients can be premixed in a separate step prior to bringing all of the ingredients together.

In some embodiments, the invention concerns use of the compositions described herein as a component of a wall that is used in a package for oxygen sensitive materials. The necessary scavenging capacity of a package will generally have to be greater for walls that have a greater permeance in the absence of scavenging additives. Accordingly, a good effect is harder to achieve with inherently higher permeance materials are used.

The wall may be a rigid one, a flexible sheet, or a clinging film. It may be homogenous or a laminate or coated with other polymers. If it is laminated or coated, then the scavenging property may reside in a layer of the wall the permeance of which is relatively high in the absence of scavenging and which alone would not perform very satisfactorily but which performs satisfactorily in combination with one or more other layers which have a relatively low permeance but negligible or insufficient oxygen-scavenging properties. A single such layer could be used on the outside of the package since this is the side from which oxygen primarily comes when the package is filled and sealed. However, such a layer to either side of the scavenging layer would reduce consumption of scavenging capacity prior to filling and sealing.

When the instant compositions are used in a wall or as a layer of a wall, the permeability of the composition for oxygen is advantageously not more than about 3.0, or about 1.7, or about 0.7, or about 0.2, or about 0.03 $cm^3$ mm/($m^2$ atm day). The permeability of the composition provided by the present invention is advantageously not more than about three-quarters of that in the absence of oxygen-scavenging properties. In some embodiments, the permeability is not more than about one half, one-tenth in certain embodiments, one twenty-fifth in other embodiments, and not more than one-hundredth in yet other embodiments of that in the absence of oxygen-scavenging properties. The permeability in the absence of oxygen-scavenging properties is advantageously not more than about 17 $cm^3$ mm/($m^2$ atm day), or about 10, and or about 6. A particularly good effect can be achieved for such permeabilities in the range from about 0.5, or about 1.0, to 10, or about 6.0, $cm^3$ mm/($m^2$ atm day). Measuring oxygen permeation can be performed by one of ordinary skilled in the art employing oxygen permeation (OTR) instrumentation such as, for example, OX-TRAN® instruments available from MOCON, Inc. (Minneapolis, Minn.).

In another aspect, the instant composition can be used as a master batch for blending with a polymer or a polymer containing component. In such compositions, the concentration of the oxidizable organic component and the transition metal will be higher to allow for the final blended product to have suitable amounts of these components. The master batch may also contain an amount of the polymer to which the master batch is to be blended with. In other embodiments, the master batch may contain a polymer that is compatible with the polymer that the master batch is to be blended with.

In yet another aspect, the compositions of the instant invention can be used for forming a layer of a wall which primarily provides oxygen-scavenging (another layer including polymer providing gas barrier without significant scavenging), or as a head-space scavenger (completely enclosed, together with the package contents, by a package wall). Such techniques are well know to those skilled in the art.

The time period for which the permeability is maintained can be extended by storing the articles in sealed containers or under an inert atmosphere such as nitrogen prior to use with oxygen sensitive materials.

In another aspect, the invention provides a package, whether rigid, semi-rigid, collapsible, lidded, or flexible or a combination of these, comprising a wall as formed from the compositions described herein. Such packages can be formed by methods well known to those skilled in the art.

Among the techniques that may be used to make articles are moulding generally, injection moulding, stretch blow moulding, extrusion, thermoforming, extrusion blow moulding, and (specifically for multilayer structures) co-extrusion and lamination using adhesive tie layers. Orientation, e.g., by stretch blow moulding, of the polymer is especially attractive with phthalate polyesters because of the known mechanical advantages that result.

The melt processing zone for making the article can be operated under customary conditions effective for making the intended articles, such as preforms, bottles, trays, and other articles mentioned below. In one embodiment, such conditions are effective to process the melt without substantially increasing the IV of the melt and which are ineffective to promote transesterification reactions. In some preferred embodiments, suitable operating conditions effective to establish a physical blend of the polyester polymer, oxidizable organic component, and transition metal are temperatures in the melt processing zone within a range of about 250° C. to about 300° C. at a total cycle time of less than about 6 minutes, and typically without the application of vacuum and under a positive pressure ranging from about 0 psig to about 900 psig. In some embodiments, the residence time of the melt on the screw can range from about 1 to about 4 minutes.

Specific articles include preforms, containers and films for packaging of food, beverages, cosmetics, pharmaceuticals, and personal care products where a high oxygen barrier is needed. Examples of beverage containers are bottles for holding water and carbonated soft drinks, and the invention is particularly useful in bottle applications containing juices, sport drinks, beer or any other beverage where oxygen detrimentally affects the flavor, fragrance, performance (prevent vitamin degradation), or color of the drink. The compositions of the instant invention are also particularly useful as a sheet for thermoforming into rigid packages and films for flexible structures. Rigid packages include food trays and lids. Examples of food tray applications include dual ovenable food trays, or cold storage food trays, both in the base container and in the lidding (whether a thermoformed lid or a film), where the freshness of the food contents can decay with the ingress of oxygen. The compositions of the instant invention also find use in the manufacture of cosmetic containers and containers for pharmaceuticals or medical devices.

The package walls of the instant invention can be a single layer or a multilayer constructions. In some embodiments using multilayer walls, the outer and inner layers may be structural layers with one or more protective layers containing the oxygen scavenging material positioned there between. In some embodiments, the outer and inner layers comprise and polyolefin or a polyester. In certain embodiments, a single layer design is preferred. Such a layer may have advantages in simplicity of manufacture and cost.

In this specification and in the claims that follow, reference will be made to a number of terms, which shall be defined to have the following meanings:

As used herein, the phrase "having the formula" or "having the structure" is not intended to be limiting and is used in the same way that the term "comprising" is commonly used. The term "independently selected from" is used herein to indicate that the recited elements, e.g., R groups or the like, can be identical or different.

As used herein, the terms "a", "an", "the" and the like refer to both the singular and plural unless the context clearly indicates otherwise. "A bottle", for example, refers to a single bottle or more than one bottle.

Also as used herein, the description of one or more method steps does not preclude the presence of additional method steps before or after the combined recited steps. Additional steps may also be intervening steps to those described. In addition, it is understood that the lettering of process steps or ingredients is a convenient means for identifying discrete activities or ingredients and the recited lettering can be arranged in any sequence.

Where a range of numbers is presented in the application, it is understood that the range includes all integers and fractions thereof between the stated range limits. A range of numbers expressly includes numbers less than the stated endpoints and those in-between the stated range. A range of from 1-3, for example, includes the integers one, two, and three as well as any fractions that reside between these integers.

As used herein, "master batch" refers to a mixture of base polymer, oxidizable organic component, and transition metal that will be diluted, typically with at least additional base polymer, prior to forming an article. As such, the concentrations of oxidizable organic component and transition metal are higher than in the formed article.

The following examples are included to demonstrate preferred embodiments of the invention regarding synthesis of the molecules and use of the molecules to scavenge oxygen as well products containing such scavengers. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The following examples are provided for the purpose of further illustrating the present invention but are by no means intended to limit the same.

EXAMPLES

Example 1

Synthesis and Oxygen Scavenging Evaluation of MXBMT

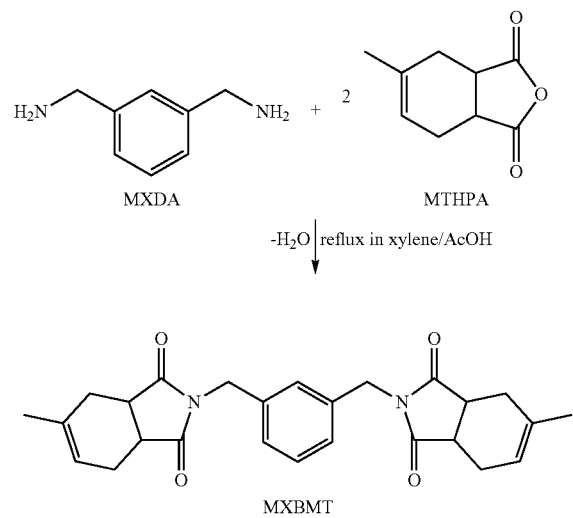

A mixture of xylene (1.5 L) and glacial acetic acid (1.5 L) was charged into a 5 L reaction vessel equipped with a Dean-Stark Trap/reflux condenser assembly and a mechanical stirrer (a Dean Stark Trap is an efficient laboratory device used to continuously remove the water that is produced during a reaction as a by-product and drive the reaction to completion). Into the above 5 L reactor containing the solvent mixture, was added gradually with stirring, 518.5 grams (3.12 moles) of methyl tetrahydrophthalic anhydride (available under the trade name ECA1000 from Dixie Chemical Company Inc., Houston, Tex., U.S.A.). The reaction mixture was gradually heated to 100-120° C. while stirring. To the resulting warm solution was then added 215.4 grams (1.56 moles) of m-xylylene diamine (from Sigma-Aldrich) gradually at such a rate that the refluxing remained under control. During the addition, a reaction begins to take place and the water formed as a by-product begins to collect and separate as a dense layer from the xylene/acetic acid mixture condensed in the Dean Stark Trap.

During the addition of m-xylylylene diamine, which was carried out over a period of 30 minutes, the reaction mixture remained clear at this temperature with no visible suspensions formed. The refluxing of the reaction mixture was continued for an additional period of 4 hours. During this period the water, formed as the by-product of the reaction, was continuously collected as a lower layer in the Dean-Stark apparatus and it was drained off periodically as much as needed. The completion of reaction was monitored by testing a small sample of the reaction mixture with thin layer chromatography (TLC). At the end of 4 hour refluxing period, the TLC analysis of the crude reaction mixture showed that the reaction was essentially complete.

The solvent (xylene/acetic acid mixture) from the reaction mixture was then removed by distillation under reduced pressure and the crude reaction product was dissolved in methylene chloride, washed successively with aqueous 1N HCl solution, aqueous saturated sodium bicarbonate solution and water. The resulting methylene chloride solution was then dried over anhydrous sodium sulfate, concentrated by evaporating the solvent and purified through silica gel column. The product was then vacuum stripped to remove all of the residual methylene chloride in order to isolate 560 grams of the pure product as a thick gel/viscous oil. As shown in FIG. 1, proton NMR confirmed the structure and purity of the product.

To illustrate its oxygen scavenging capability, a sample of MXBMT (15 g) was placed in large headspace vial/jar (932 mL) into which was added a mixture of cobalt neodecanoate (2500 ppm) and n-hydroxyphthalimide (1000 ppm) as catalyst and cocatalyst respectively. The jar was sealed with a rubber septum containing cap and kept in an oven at about 75° C.-83° C. The oxygen content in the jar was measured periodically by withdrawing a gas sample with a syringe and analyzing it on a Mocon headspace oxygen analyzer equipment (available from MOCON Modern controls, Minneapolis, Minn.). After an initial oxygen content measurement, the subsequent measurements monitor the decrease in oxygen content due to the oxygen scavenging over a period of several days. The data from this example is listed in Table 1.

TABLE 1

MXBMT Oxygen Scavenging Data

| # Days → | 0 | 1 | 2 | 8 |
|---|---|---|---|---|
| % Oxygen content in the jar | 20.1 | 15.9 | 15.8 | 10.9 |

Note:
A small amount of water (0.2 g) was injected into the jar after 7 days.

The above data illustrates that MXBMT is capable of scavenging the oxygen from the air contained in the jar depleting the oxygen content from 20.1% to 10.9% in 8 days.

Example 2

MXBC as an Oxygen Scavenger

This example illustrates the use of m-xylylene bis(citraconimide) (MXBC), also known as 1,3-bis(citraconimidomethyl)benzene (CAS#119462-56-5), as a novel oxygen scavenger additive in PET. The structure of MXBC is:

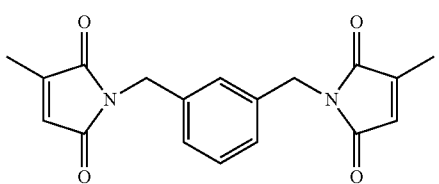

m-Xylylene-bis(citraconimide)

MXBC is commercially available from Flexsys U.S.A., under the tradename Perkalink 900, a rubber chemical.

99 parts by weight of dry PET pellets were tumble blended with 1 part of MXBC and 2500 ppm cobalt neodecanoate powder. The blended mixture was directly molded on injection moldimg machine into rectangular plaques of 15.9 cm long by 4.4 cm wide and having five equal sections with increasing stepped thicknesses of 2 mm, 1.8 mm, 2.5 mm, 3.3 mm and 4 mm. The plaques were tested for oxygen scavenging by placing them (typically 7) in a 32 oz. glass jar containing one ounce of water. The jar is capped with a canning jar lid having a rubber septum. The oxygen content in the jar was measured periodically by inserting a syringe needle through the septum, withdrawing a gas sample and analyzing on a Mocon headspace oxygen analyzer equipment (available from MOCON Modern Controls, Minneapolis, Minn.). After an initial oxygen content measurement the subsequent measurements monitor the decrease in oxygen content due to the oxygen scavenging over a period of several days. The data from this example is listed in Table 2 and shows a decrease in the oxygen content in the jar containing the plaques, illustrating their oxygen scavenging performance.

TABLE 2

MXBC Oxygen Scavenging Data

| | # Days | | | | | |
|---|---|---|---|---|---|---|
| | 0 | 3 | 6 | 10 | 17 | 24 |
| % Oxygen content in the jar | 20.4 | 20 | 19.9 | 19.1 | 18.4 | 18.9 |

Example 3

A mixture of 140 g of m-xylylene-bis-(citraconimde), 5.6 g Cobalt neodecanoate and 6854 g of dry PET pellets was tumble blended. The blend was used as the barrier layer a 3-layer coinjection molded bottle preform. The 3-layer preforms were made by a sequential co-injection process consisting of 2 separate extruder feeds. In the PET feed extruder (extruder "A" heated to 260-270° C.), a commercial bottle grade PET (0.85 IV PET from M&G) dried to low moisture content <10 ppm was used. In the barrier resin feed extruder (extruder "B" heated to 240-260° C.), the PET blend containing the oxygen scavenger (MXBC) and cobalt neodecanoate was fed into the extruder. The two melt feeds from the A & B extruders were sequentially injection molded, using a 2003 Battenfeld A800/200H/125HC co-injection molding machine into a single cavity 30 g 33 mm finish ketchup bottle preform to form a 3-layer preform with the middle layer of the barrier PET blend material comprising ca. 40% of the total preform weight. The cycle time for molding was about 30 sec.

In a $2^{nd}$ step the above multilayer performs were reheat-stretch-blowmolded into multilayer bottles. In the present example, the bottles were stretch blown on a Sidel SBO-1 machine running ca. at 800 bottles per hour. In the process, the preforms were typically heated to a surface temperature of 99° C. prior to the blowing operation. The blow mold temperature was about 12° C. The blow pressures were about 33 bar. The bottles obtained were clear and showed no major delamination failures in 6 ft angle drop tests.

Example 4

Synthesis of m-Xylylene-bis(tetrahydrophthalimide) ('MXBT')

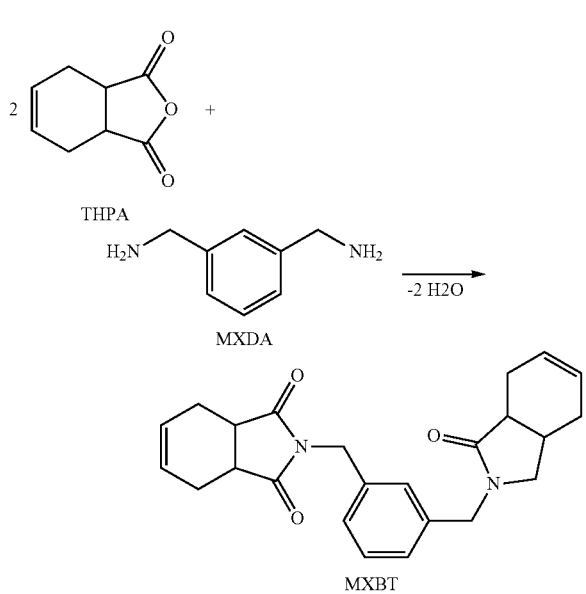

Figure 2:
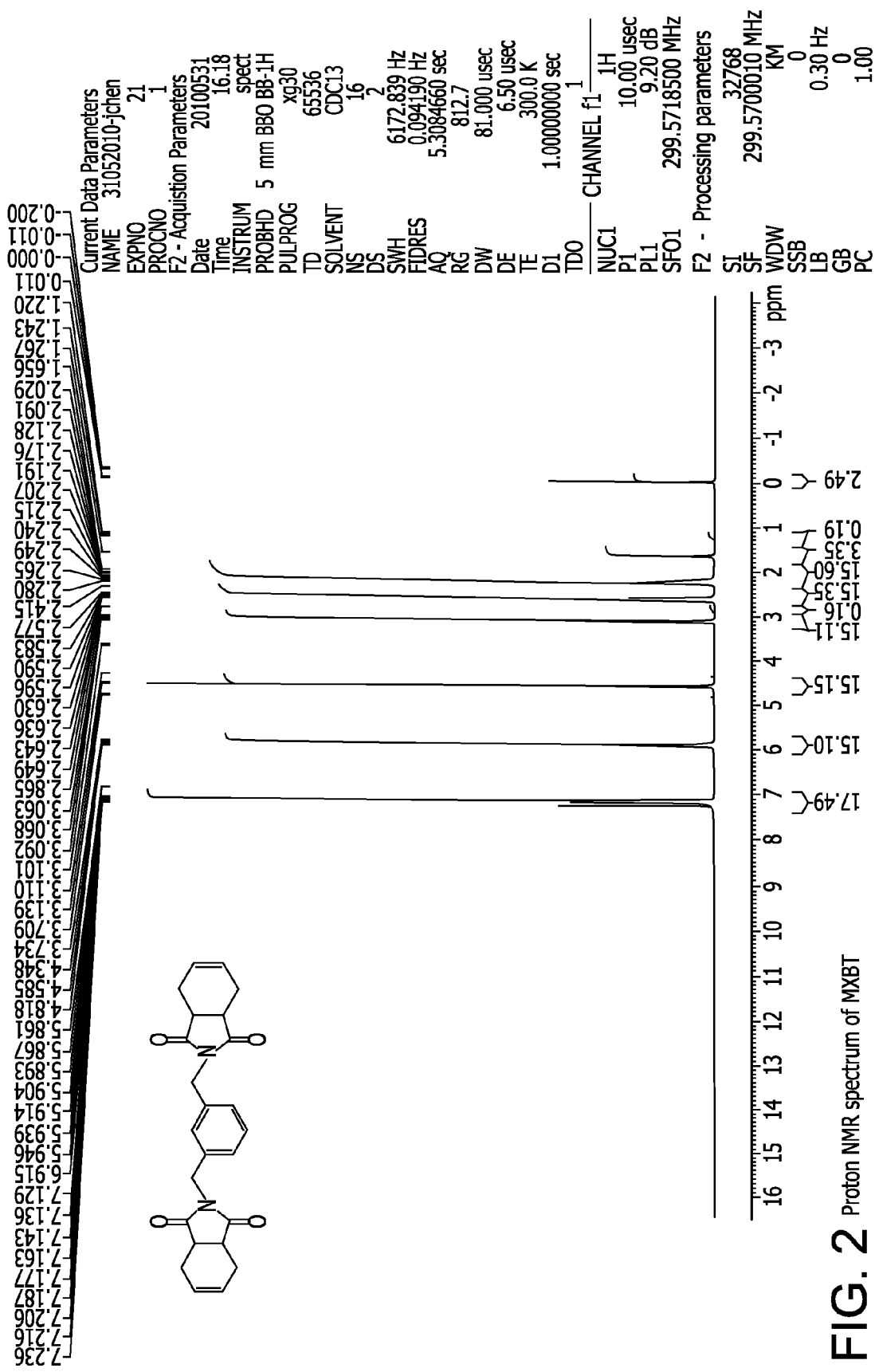
FIG. 2 is a proton NMR spectra of an oxygen scavenging compound for use in the present invention.

To a mixture of 1.5 liters of xylene and 1.5 liters of glacial acetic acid in a 5 liter reaction vessel equipped with a Dean-Stark trap, was added 541 grams (3.55 moles) of tetrahydrophthalic anhydride (THPA). The mixture was heated to 100-120° C. To this warm solution was added 242 grams (1.78 moles) of m-xylylene diamine (MXDA) at such a rate that the reflux remained under control. During the addition, the water/acetic acid mixture begins to separate from the xylene/acetic acid mixture in the Dean Stark trap. The addition was carried out over a total period of 30 min. After an additional 4 hrs. under reflux, TLC showed that the reaction was complete. The solvent was then evaporated under reduced pressure and the solid product was dissolved in methylene chloride, washed successively with 1N HCl, sat. $NaHCO_3$, water and then dried over $Na_2SO_4$. The solution was then concentrated and the product recrystallized as a white solid (yield: 550 g). As shown in FIG. 2, the proton NMR confirmed the structure and high purity (>99%) of MXBT.

Examples 5 to 11

Injection Molding and Oxygen Scavenging Measurement of PET-MXBT Blend Plaques

Figure 3:
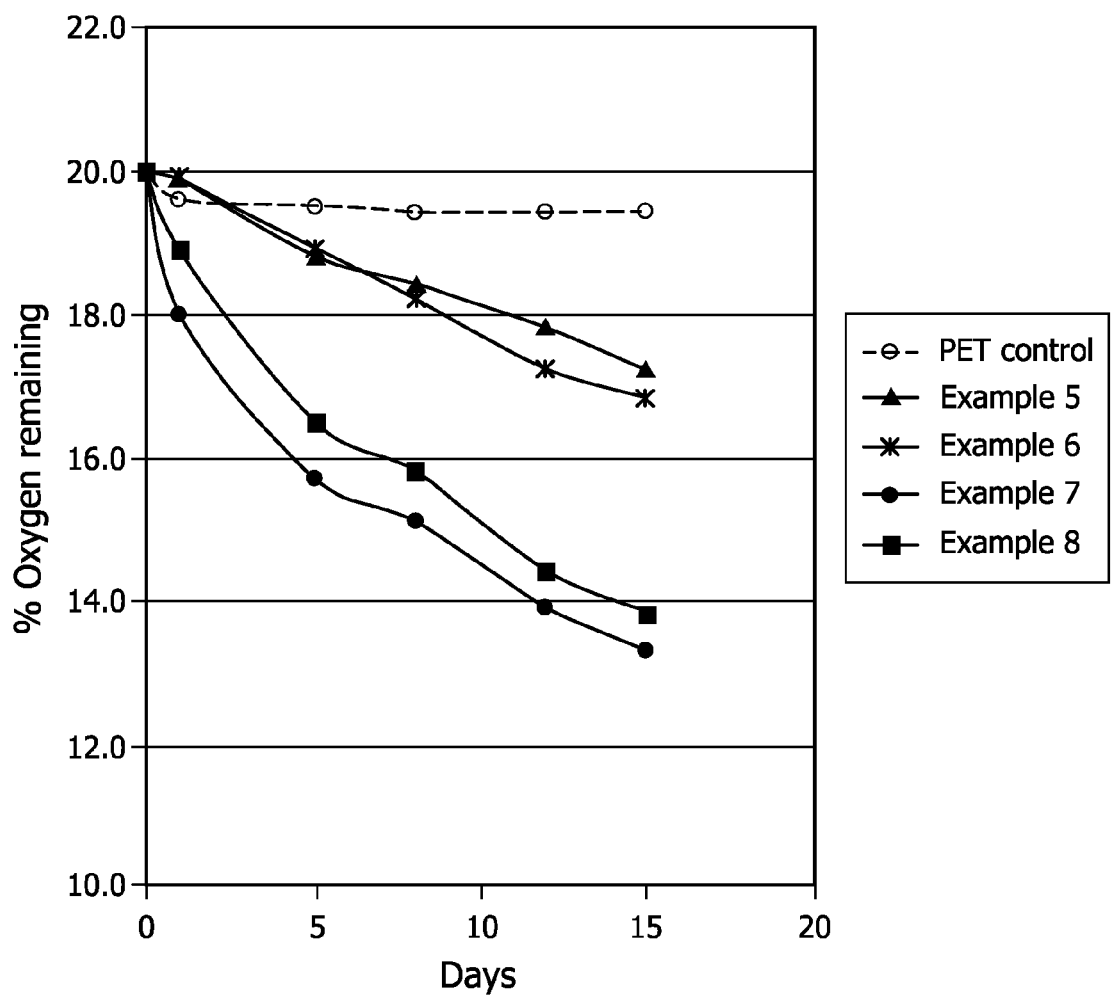
FIG. 3 is a graph illustrating the oxygen scavenging performance of certain embodiments of the present invention.
Figure 4:
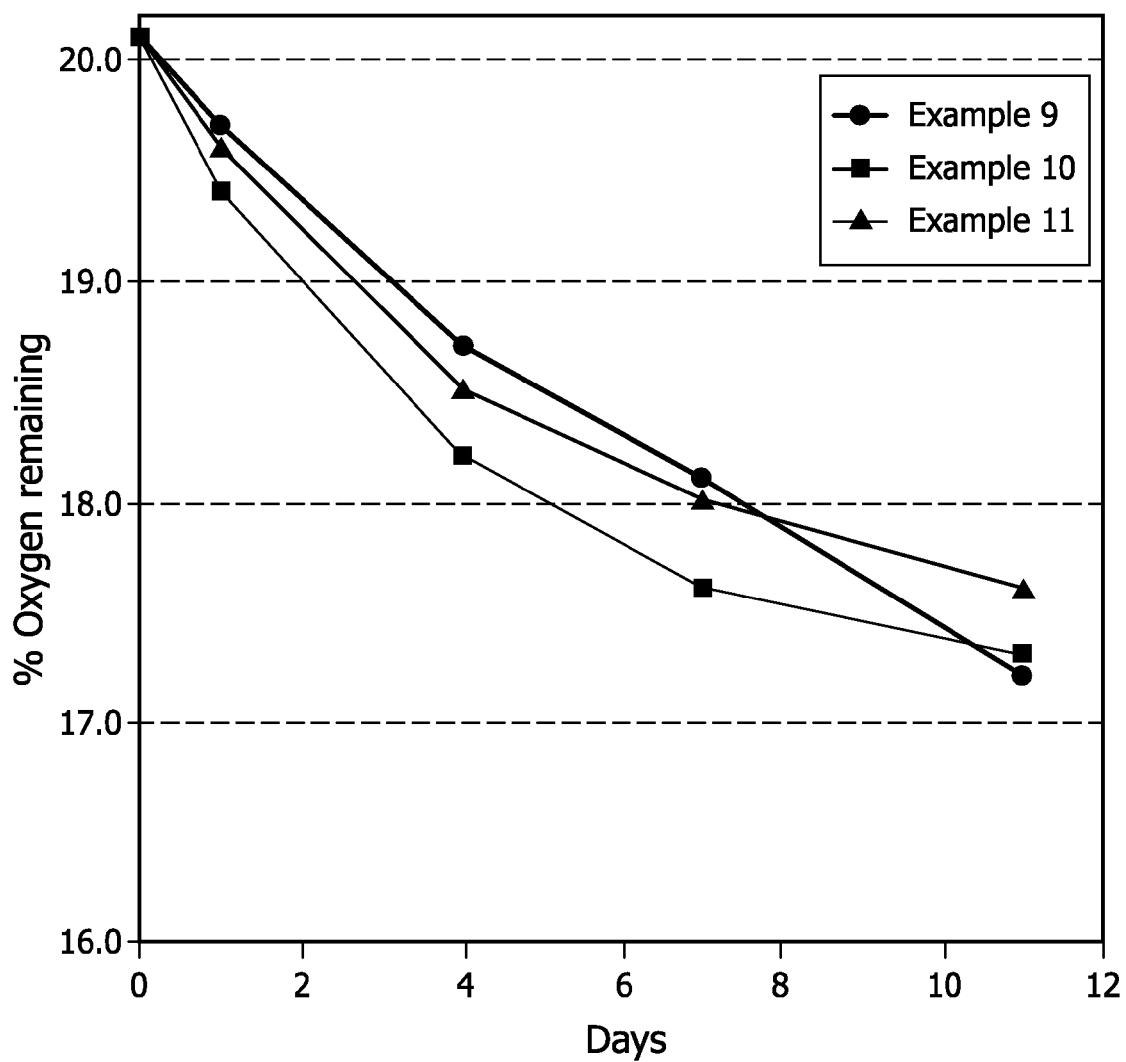
FIG. 4 is a graph illustrating the oxygen scavenging performance of certain embodiments of the present invention.

Commercial bottle grade PET pellets (Heatwave CF746, Eastman) were thoroughly dried and then tumble blended with various levels of MXBT (from Example 4) and cobalt neodecanoate as catalyst and including an optional activating compound such as N-hydroxy phthalimide, low molecular weight polyethyleneglycol diester (Tegmer 609 from Hallstar) or a low molecular weight polyvinylpyrrolidone (Luvitek, from BASF). The specific compositions of Ex. 5-11, are shown in Table 3. In each case, the blended PET-MXBT mixture was directly molded on injection molding machine into rectangular plaques of 15.9 cm long by 4.4 cm wide and having five equal sections with increasing stepped thicknesses of 2 mm, 1.8 mm, 2.5 mm, 3.3 mm and 4 mm. The plaques were tested for oxygen scavenging by placing them (typically 7) in a 32 oz. glass jar containing one ounce of water. The jar is capped with a canning jar lid having a rubber septum. The oxygen content in the jar was measured periodically by inserting a syringe needle through the septum, withdrawing a gas sample and analyzing on a Mocon headspace oxygen analyzer equipment (MOCON Modern Controls, Minneapolis, Minn.). After an initial oxygen content measurement the subsequent measurements monitor the decrease in oxygen content due to the oxygen scavenging over a period of several days. The oxygen scavenging data as shown in FIGS. 3 and 4 clearly illustrates the excellent oxygen scavenging performance of MXBT in PET matrix as compared to the PET control.

TABLE 3

PET-MXBT Blend Compositions for Plaque Molding and Oxygen ScavengingTests

| Example | Molded Plaque Composition | Scavenging Test Temperature (° C.) |
|---|---|---|
| 5 | PET + 3% MXBT + 0.1% CoNeo + 0.5% NHPI | 50 |
| 6 | PET + 3% MXBT + 0.1% CoNeo + 1% PVP | 50 |
| 7 | PET + 6% MXBT + 0.1% CoNeo + 0.5% NHPI | 50 |
| 8 | PET + 6% MXBT + 0.1% CoNeo + 1% PVP | 50 |
| 9 | PET + 4% MXBT + 0.1% CoNeo | 38 |
| 10 | PET + 4% MXBT + 0.1% CoNeo + 1% Tegmer 609 | 38 |
| 11 | PET + 4% MXBT + 0.1% CoNeo + 0.3% NHPI | 38 |

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

The invention claimed is:

1. A composition comprising:
   a) a base polymer;
   b) at least one non-polymeric oxidizable organic compound having the structure of Formula I or II:

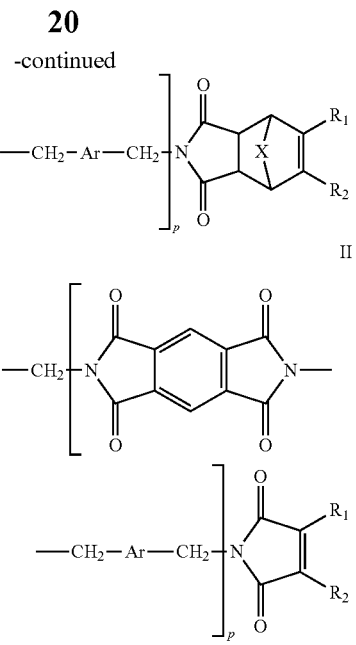

wherein:
   Ar is an o-, m-, or p-phenylene moiety, a substituted phenylene moiety, or a naphthalene moiety;
   $R_1$ and $R_2$ are independently selected from the group consisting of: hydrogen, alkyl, alkenyl, and aryl;
   X is O or $—(CH_2)_n—$; and
   n=0, 1, or 2;
   p=0, 1, or 2; and
   c) at least one transition metal in a positive oxidation state, said metal being present in the composition in an amount of from about 10 to about 400 ppm,
   wherein said compound is present in an amount of from about 0.10 to about 10 weight percent of the composition.

2. The composition of claim 1, wherein said at least one transition metal is cobalt.

3. The composition of claim 2 wherein said at least one transition metal further comprises zinc.

4. The composition of claim 1 wherein said base polymer comprises a polyester polymer.

5. The composition of claim 4 wherein the polyester polymer is polyethylene terephthalate.

6. The composition of claim 1 wherein the compound is present in an amount of about 1 to about 10 weight percent based on the weight of the composition.

7. The composition of claim 1 wherein the compound is present in an amount of about 1 to about 5 weight percent based on the weight of the composition.

8. The composition of claim 1 wherein the compound is present in an amount of about 1 to about 3 weight percent based on the weight of the composition.

9. The composition of claim 1 wherein the concentration of transition metal is 30 to 150 ppm.

10. The composition of claim 1 wherein the non-polymeric oxidizable organic compound is m-xylylene-bis-(tetrahydrophthalimide):

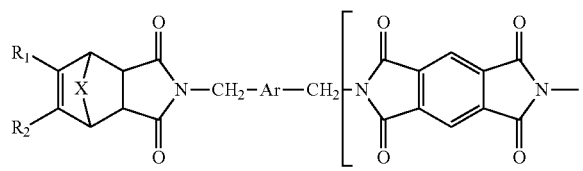

11. The composition of claim 1 wherein the non-polymeric oxidizable organic compound is m-xylylene-bis-citraconimide:

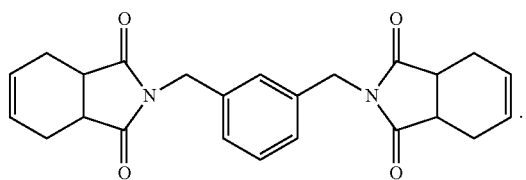 [SMILES: O=C1C2CC=CCC2C(=O)N1Cc1cccc(CN2C(=O)C3CC=CCC3C2=O)c1]

12. A composition comprising:
a) polyethylene terephthalate;
b) m-xylylene-bis-(tetrahydrophthalimide):

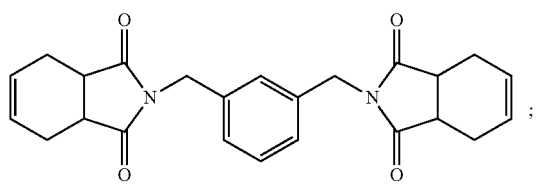 [SMILES: O=C1C2CC=CCC2C(=O)N1Cc1cccc(CN2C(=O)C3CC=CCC3C2=O)c1]

c) at least one transition metal in a positive oxidation state, said metal being present in the composition in an amount of from about 10 to about 400 ppm,
wherein the m-xylylene-bis-(tetrahydrophthalimide) is present in an amount of from about 0.10 to about 10 weight percent of the composition.

13. The composition of claim 12, wherein said at least one transition metal is cobalt.

14. The composition of claim 13 wherein the concentration of transition metal is 30 to 150 ppm.

15. A wall for a package comprising at least one layer, said layer comprising a composition, said composition comprising:
a) a base polymer;
b) at least one compound having the structure of Formula I or II

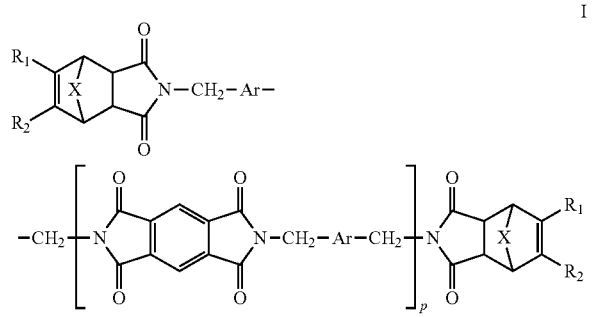

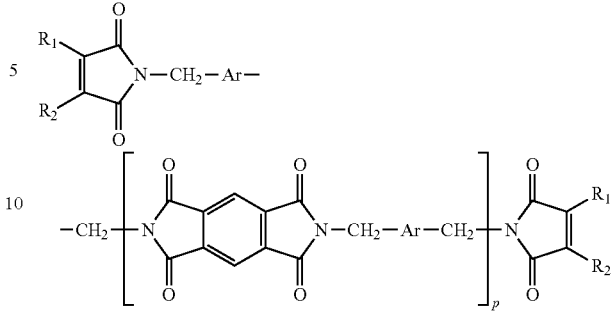

wherein:
Ar is an o-, m-, or p-phenylene moiety, a substituted phenylene moiety, or a naphthalene moiety;
$R_1$ and $R_2$ are independently selected from the group consisting of: hydrogen, alkyl, alkenyl, and aryl; and
X is O or —$(CH_2)_n$—; and
n=0, 1, or 2;
p=0, 1, or 2; and
c) at least one transition metal in a positive oxidation state, said metal being present in the composition in an amount of from about 10 to about 400 ppm,
wherein said compound is present in an amount of from about 0.10 to about 10 weight percent of the composition.

16. The wall of claim 15, wherein said at least one transition metal is cobalt.

17. The wall of claim 16 wherein said at least one transition metal further comprises zinc.

18. The wall of claim 15 wherein said base polymer comprises a polyester polymer.

19. The wall of claim 18 wherein the polyester polymer is polyethylene terephthalate.

20. The wall of claim 15 wherein the compound is present in an amount of about 1 to about 10 weight percent based on the weight of the composition.

21. The wall of claim 15 wherein the compound is present in an amount of about 1 to about 5 weight percent based on the weight of the composition.

22. The wall of claim 15 wherein the compound is present in an amount of about 1 to about 3 weight percent based on the weight of the composition.

23. The wall of claim 15 wherein the concentration of transition metal is 30 to 150 ppm.

24. A wall for a package comprising at least one layer, said layer comprising a composition, said composition comprising:
a) polyethylene terephthalate;
b) m-xylylene-bis-(tetrahydrophthalimide):

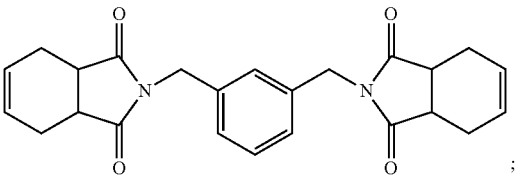 [SMILES: O=C1C2CC=CCC2C(=O)N1Cc1cccc(CN2C(=O)C3CC=CCC3C2=O)c1]

c) at least one transition metal in a positive oxidation state, said metal being present in the composition in an amount of from about 10 to about 400 ppm, wherein the m-xylylene-bis-(tetrahydrophthalimide) is present in an amount of from about 0.10 to about 10 weight percent of the composition.

25. The wall of claim 24, wherein said at least one transition metal is cobalt.

26. The wall of claim 25 wherein the concentration of transition metal is 30 to 150 ppm.

* * * * *